Oct. 22, 1946.　　C. T. WALTER ET AL　　2,409,724
BANDING MACHINE
Filed Dec. 15, 1941　　5 Sheets-Sheet 1

ATTEST -

*Wm. C. Meiser*

BY

Charles T. Walter
and Lowell R. Newton
INVENTOR

*R. D. Story*
ATTORNEY

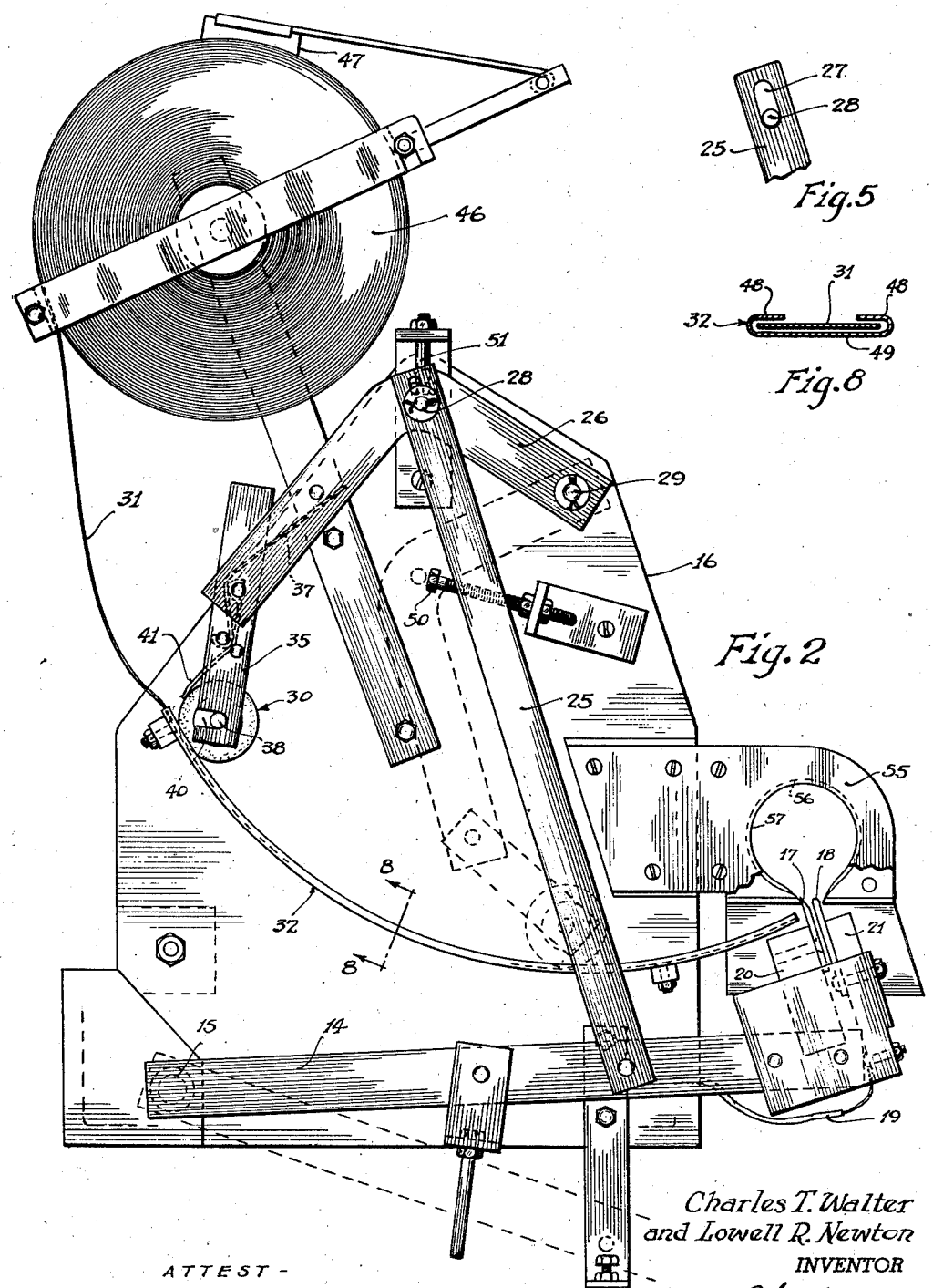

Oct. 22, 1946.  C. T. WALTER ET AL  2,409,724
BANDING MACHINE
Filed Dec. 15, 1941    5 Sheets-Sheet 3

Charles T. Walter
and Lowell R. Newton
INVENTOR

ATTEST-

BY

ATTORNEY

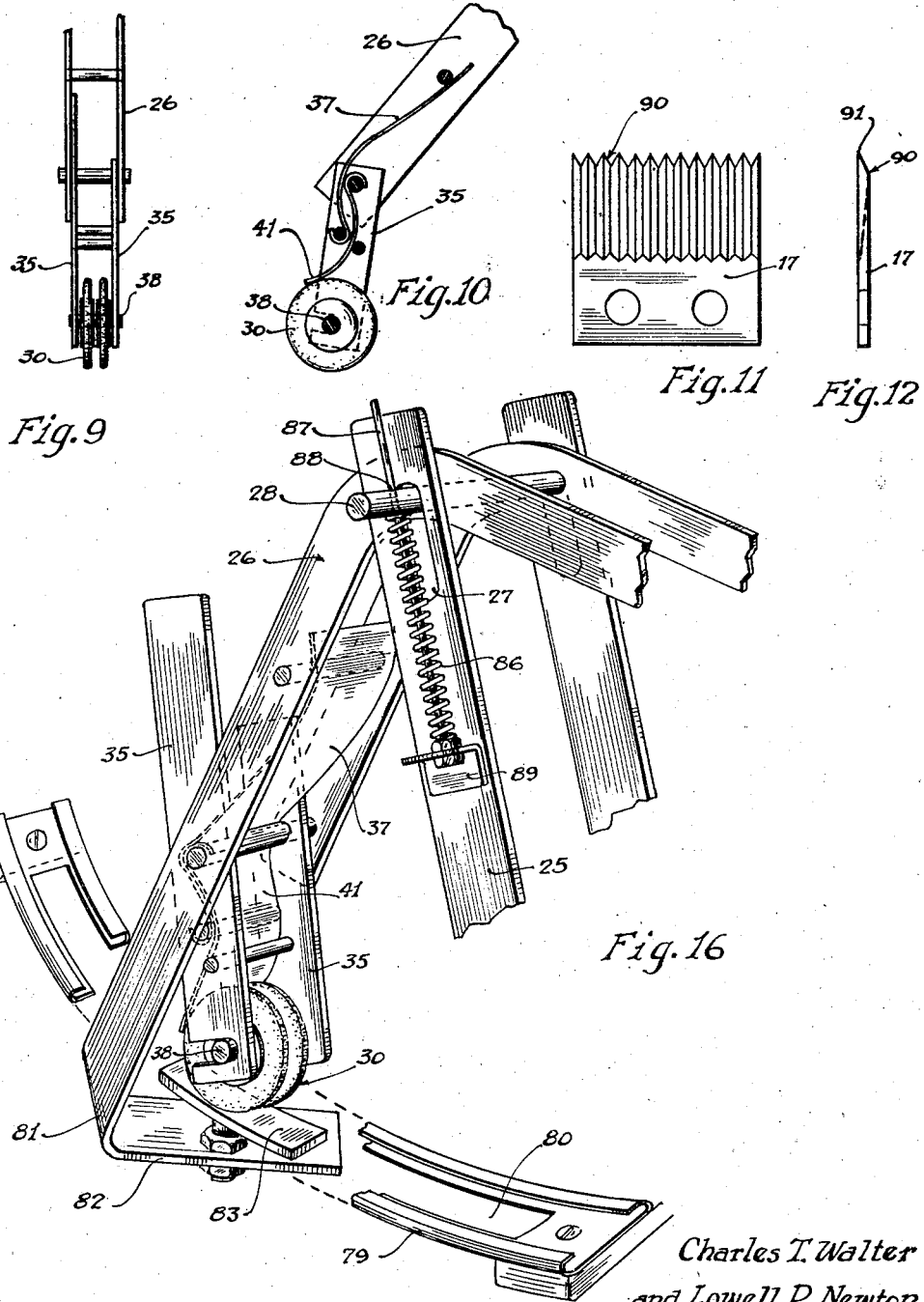

Oct. 22, 1946.      C. T. WALTER ET AL      2,409,724
BANDING MACHINE
Filed Dec. 15, 1941      5 Sheets-Sheet 5

ATTEST-
Ivan C. Meiser

Charles T. Walter
and Lowell R. Newton
INVENTOR

BY
R.G. Story
ATTORNEY

Patented Oct. 22, 1946

2,409,724

UNITED STATES PATENT OFFICE 2,409,724

BANDING MACHINE

Charles T. Walter and Lowell R. Newton, Chicago, Ill., assignors to Industrial Patents Corporation, Chicago, Ill., a corporation of Delaware Application December 15, 1941, Serial No. 422,973

14 Claims. (Cl. 216—29)

This invention relates to a machine for applying bands to an article, and more particularly to a device for forming a paper label into a loop around a substantially cylindrical article and affixing the label thereto.

It is an object of this invention to provide a machine for delivering a strip of connected labels to form a loop so that a label may be tensioned around an article inserted in the loop and applied thereto as it is severed from the strip.

It is another object of this invention to provide an improved strip feed mechanism.

Another object of this invention is to provide a cutting means to sever the label tensioned around an article from the strip and having means acting therewith to hold the label on the article while it is being affixed to the article.

Another object of the invention is to provide a simplified structure including means to co-ordinate the drive of the feed, cutting, and affixing means.

In the drawings:

Fig. 2 is a side elevation of the label strip supply, the strip drive, strip curling means, and label severing and affixing means.

Fig. 5 is a detail of the lost motion connection between the strip drive mechanism and the machine drive.

Fig. 8 is a sectional view of the strip feed chute taken on line 8—8 of Fig. 2.

Fig. 9 is a detail front view of the presser foot for driving the label.

Fig. 10 is a sectional elevation of the presser foot shown in Fig. 9.

Fig. 11 is a front elevation of the label severing means.

Fig. 12 is a side elevation of the severing means shown in Fig. 11.

Fig. 16 is a perspective of a modified strip feed device.

The machine forming the subject of this invention is designed to handle labels supplied in endless strip form and includes a feeding mechanism for delivering the strip into a curling means so that a loop is formed at the end thereof with a portion of the extreme end of the strip being turned into overlapping relation with the rest of the strip. An article may then be placed in the loop, which is preferably formed to a diameter substantially larger than that of the article, and the machine is actuated to retract the strip and, if the label is engaged against the article adjacent the overlapped end, the retraction tensions the strip around the article. Means then function to sever the tensioned strip and bind the overlapped ends of the label together to permanently affix the severed portion of the strip to the article. The banded article may then be withdrawn and the cycle of operations is repeated.

Figure 1:
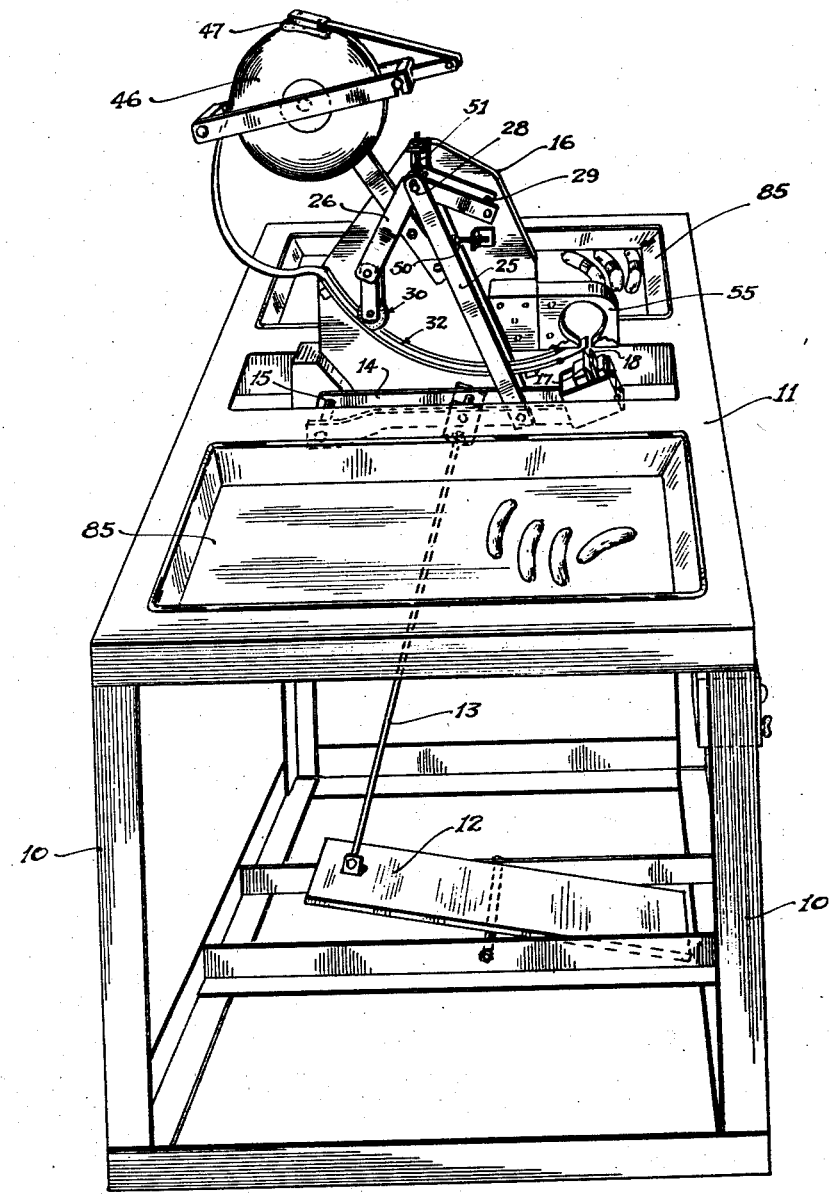
Fig. 1 is a side perspective of the entire machine.
Figure 4:
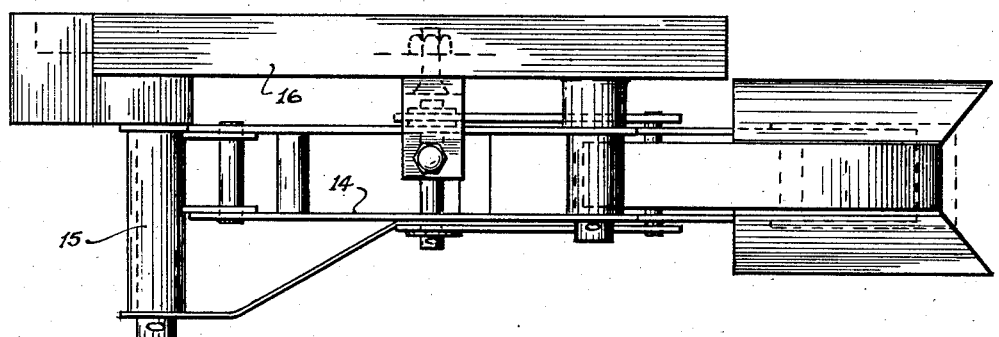
Fig. 4 is a plan view of the mechanism shown in Fig. 3.
Figures 6, 7:
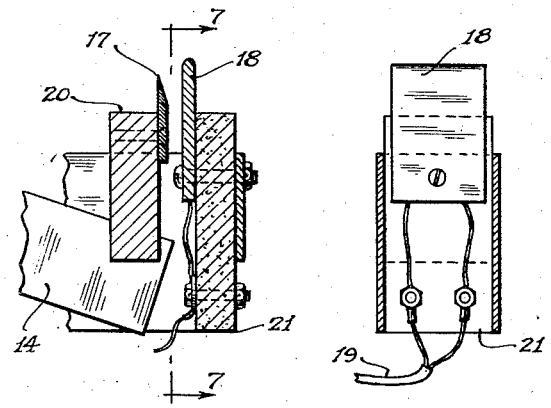
Fig. 6 is a sectional side elevation of the label severing and affixing means.
Fig. 7 is a view taken on line 7—7 of Fig. 6.
Figure 3:
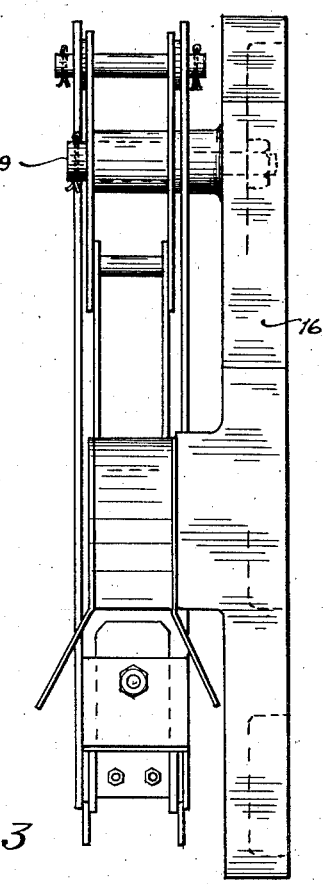
Fig. 3 is a front elevation of the strip drive and label severing and affixing means.

The mechanism for accomplishing the labeling operation above described is mounted upon standards 10 as shown in Fig. 1, and is provided with a table 11. A substantially balanced treadle 12 is supported from standards 10 and the operator, through it, supplies the small amount of power required to drive the various elements of the machine. The motion of the treadle is transmitted to the mounting for the severing and affixing means by push rod 13 pivotally connected between the treadle and a lever arm 14 upon which the severing and affixing means are mounted. The lever 14 is pivotally mounted about a bearing 15 supported from the fixed wall 16 carried by table 11. At its opposite end lever 14 carries a knife 17 and heater element 18. The heater is of the electrical resistance type, and current is supplied through a circuit including wires 19. The knife is fixedly secured to the support 20 welded to the end of lever 14, and the heater is mounted from the end of lever 14 on the electrical insulating and heat insulating block 21.

The motion of lever 14 is transmitted to the strip feeding means through link 25 which drives lever 26 through a lost motion connection including slot 27 and pin 28 as shown in Fig. 5. The purpose of the lost motion connection will appear below. Lever 26 is mounted from wall 16 on bearing 29 and the driven lever 26 carries a presser foot 30 upon its lower end; said presser foot may be and preferably is made of a resilient material such as rubber having the texture of the usual typewriter eraser. The presser foot is resiliently urged into engagement with the strip 31 threaded into guide means 32 and when lever 26 is driven in either direction, the presser foot carries the strip with it to feed the strip to or retract it from the curling means, or loop forming means.

The presser foot 30, as shown in Fig. 10, is rotatably mounted at the lower end of arm 35 movably supported from the lever 26 and a spring 37 is disposed to resiliently urge arm 35 in a direction to force the presser foot against the strip and guide chute 32. The presser foot is mounted on an axle 38, the ends of which are carried in the U shaped bearing slots 40 cut into the arms 35. A spring 41 engages the presser foot to urge it into seating relation in the bearing slots 40 and also serves to control the rotation of the presser foot as will appear more fully below.

It will be noted that arm 35 is not disposed in a straight line with respect to lever 26 and on a downward or feed stroke as best seen in Fig. 2, if the strip encounters any undue resistance, the presser foot is made to engage more firmly. The greater pressure produced between the strip and presser foot, by this toggle type action, will overcome any tendency of the strip to slip relative to the presser because of the slightly increased friction. Under normal operating conditions however, the pressure produced by spring 37 is sufficient to drive the label strip 31 through chute 32.

The strip guide means or chute 32, a cross section of which is shown in Fig. 8, receives the strip of labels 31 from a roll 46 mounted on wall 16. An oil pad 47 presses lightly against the labels being delivered to the chute 32 to remove any dust particles and provide a slight lubrication for the strip passing through the chute.

The chute includes the inturned portions 48 and a floor 49, and the presser foot 30 operates between the inturned portions 48 to frictionally engage the strip to drive it through the guide 32. The guide is substantially arcuate in form and is disposed in concentric relation with respect to the bearing 29 about which lever 26 rotates. Thus, as the lever 26 is driven to oscillate about the bearing 29 by link 25, the presser foot, engaging the label strip, drives it forwardly and backwardly through the guide 32.

The length of the strip fed through the guide during each cycle of operations is controlled by the stops 50 and 51 which engage lever 26 to limit its movement. The stop 50 limits the downward or forward feed movement of lever 26, and the stop 51 limits the backward feed movement of lever 26. The stops are adjustably supported from the wall 16.

Figure 13:
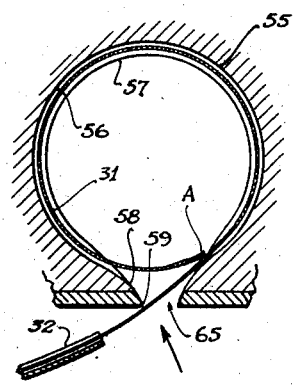
Figs. 13, 14 and 15 are side elevations of the label curling, affixing, and severing means showing the label and these means in various stages of the application of the label to the article.
Figure 14:
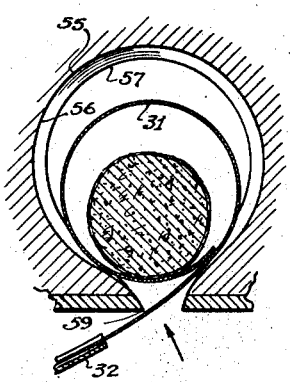
Figure 15:
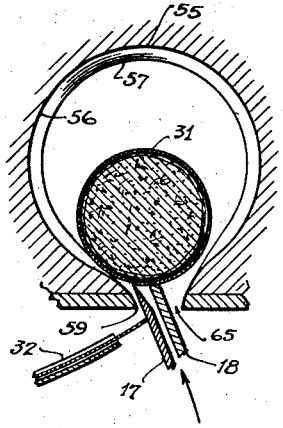
Figure 18:
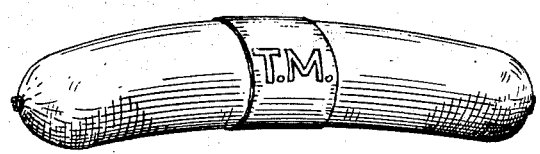
Fig. 18 is a view of a labeled article.
Figure 17:
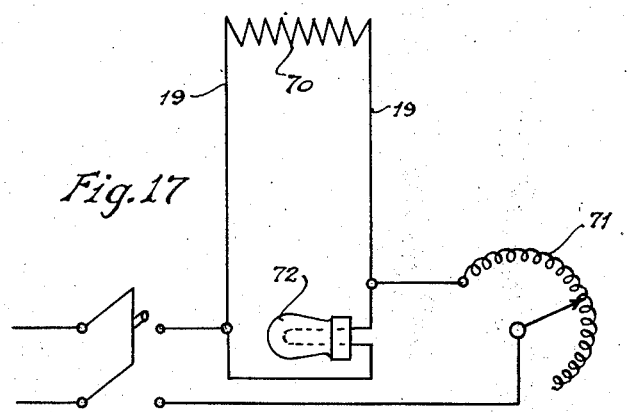
Fig. 17 is a diagram of the electrical circuit for the label affixing means.

The label strip delivered through the guide chute issues into the curling means 55, where as shown in Figs. 13, 14 and 15 the label is forced around the substantially circular surface 56 to be formed into a loop. The feed stroke of lever 26 is controlled to force a sufficient length of strip into the curling means such that the extreme end A of the strip will be disposed to overlap slightly, the remainder of the strip. The surface 56 of the curling means is slightly wider than the width of the strip and is provided with walls 57 on each side which confine the strip to and direct it around surface 56 of the curling means as the strip is driven forwardly. The walls 57 extend throughout the entire length of the surface 56 except that, adjacent the overlapping portion of the strip, the walls 57 are relieved to expose a ledge 58 formed as a continuation of surface 56.

The ledge 58 is exposed so that the label may be pressed thereagainst and a shearing edge 59 is disposed below the ledge 58. The knife 17 is driven upwardly to cooperate with the ledge 59, as best shown in Figs. 14 and 15, so that the end label on the strip which has been formed into a loop and drawn tight around the article may be severed from the strip and applied to an article. The heater 18 carried by the lever 14 along with knife 17 passes through the throat 65 of curling means 55, as shown in Fig. 15, to engage the overlapped ends of the strip for rendering the thermoplastic glue coated on the strip tacky so that the label may be affixed to the article.

The proper temperature of heater 18 is maintained by the electrical resistance 70 supplied with current through wires 19 and the temperature of the resistance element may be varied by means of the rheostat 71. A light 72 may be inserted in the circuit to indicate when the heater is in operation.

In Fig. 16 an alternate strip drive means is shown, and in this construction the arcuate strip guide 79 is provided with a slot 80 through its floor and the lever 26, carrying the presser foot 30, also carries an extension 81 the lower end of which is disposed below the chute 79. The arm 81 has fixed thereto an inwardly extending support 82 and the plate 83 is integrally mounted from support 82. The presser foot 30 is mounted from the lever 26, as above described and as shown in Fig. 10, and the presser engages plate 83, which is carried by support 82 and arm 81 from lever 26 to oscillate in the arc of slot 80. The label strip 31 threaded into the chute 79 is positively engaged between the presser foot 30 and the plate 83, and the oscillations of lever 26 feeds and retracts the strip.

A lost motion connection is provided for the alternate form of strip drive shown in Fig. 16 and, because the presser foot 30 engaging against the plate 83 does not have a frictional engagement with any element to hold the arm 26 at the upper end of its stroke while the lost motion connection between link 25 and lever 26 performs its function, additional means must be provided to serve this function. This additional means is shown in Fig. 16 wherein the lever 26 is connected to link 25 through the spring 86 which bears against the underside of pin 28. The spring 86 is mounted over a rod 87 which reciprocates through an aperture 88 drilled through the end of pin 28. The spring 86 and rod 87 are fixedly mounted to the link 25 by the clip 89 as clearly shown in the drawings.

Table 11 carried by standards 10 has removable pans 85 mounted therein on opposite sides of the machine so that the articles being labeled may be conveniently positioned for the operator to present to the machine.

In the operation of this banding mechanism, the treadle 12, while substantially balanced, is preferably counterweighted to, under the influence of gravity, actuate lever 26 to drive the strip into the curling means 55. As shown in Fig. 1, the downward movement of push rod 13 swings lever 14 to retract the knife and heater from the throat 65 of the curling means and, the continued downward movement of rod 13 through lever 14 and link 25, drives lever 26 to cause the strip 31 to be fed through chute 32 and delivered into the curling means.

It will be noted from an inspection of Fig. 15, that the knife 17 must be withdrawn from the throat 65 before the strip can be fed into the curling means. If the strip feed lever is driven directly through link 25 from the knife carrying lever, the lost motion connection between link 25 and lever 26 must be provided. This construction permits the lever 14 and knife mounted thereon to be driven for a part of a cycle while no force is being transmitted to the lever 26. Thus the lever 26 is driven rearwardly to retract the label and tension the strip around the article inserted in the loop while the knife is being driven upwardly to sever the strip. After the knife has reached the end of its cutting stroke, the treadle is released and push rod 13 is drawn downwardly. As lever 14 swings down, the knife is withdrawn from throat 65 and link 25 is drawn down. However, no motion is transmitted to lever 26 to start the feed of the strip until the end of the slot 27 is reached, and lever 26 will be held stationary because of the friction between presser foot 30 and the bottom of the feed chute. When link 25 has moved downwardly a distance equal to the length of the slot, the knife will have been withdrawn from the path of the strip so that it may be fed into the curling means without interference, the slot then engages the pin to drive lever 26.

The lost motion construction of the alternate structure shown in Fig. 16 operates in a similar manner and the spring 86 is tensioned to normally carry the weight of lever 26 so that the spring will urge the pin 28 against the upper end of slot 27. On the downward feed stroke, after the knife has been retracted from the throat, the slot 27 engaging pin 28 drives the lever 26 downwardly to force the strip into the curling means for application to the article. After an article has been inserted in the curling means, the strip feed means is reversed to tension the label around the article and the lever 26 is thus driven rearwardly by link 25 and spring 86. The lever 26 moves to retract the strip until the lever is engaged by the rear stop which limits its movement while lever 14 carrying the knife and heater elements continues to move upwardly. As the lever 14 moves upwardly, driving link 25 with it, the spring 86 is compressed against pin 28 which is held stationary by the rear stop and slot 27 will permit the link 25 to continue to the limit of its upward stroke. Upon completion of the cutting and sealing operation lever 14 is reversed to retract the knife and heater and the knife and heater are withdrawn from the throat. During the first portion of the retracting stroke the lever 26 remains stationary because spring 86 urges the pin 28 upwardly as the link 25 moves downwardly and lever 26 does not begin its feed stroke until the pin 28 has moved through slot 27 to be engaged by the upper end of the slot. It will be apparent that rod 87 reciprocates through aperture 88 in the end of pin 28 and the desired relative motion between the knife and strip feed is thus accomplished.

With either of the feed devices described, continued downward movement of rod 13, driving through link 25, drives the strip into the curling means and the label is curled or looped into the form shown in Fig. 14 with the end A of the strip overlapping the remainder of the strip. When the strip has been formed into such a loop, an article to be banded is placed inside the loop and pressed against the ledge 58 to engage the strip between the article and the ledge. Because of walls 57, it will be impossible for the article to engage the label against the surface 56 at any place except ledge 58.

The treadle may then be actuated to drive lever 14 upwardly and link 25, after taking up the motion lost by reason of slot 27, causes the lever 26 to be driven rearwardly. The rearward movement of lever 26 and presser foot 30 carries the label strip rearwardly through the chute 32 retracting the strip from the curling means, and as shown in Fig. 14 the strip will be drawn around the article until it is tensioned to conform snugly to the periphery of the article. When the label is so tensioned the presser foot 30 will begin to slip with respect to the strip as lever 26 continues through its rearward stroke and the presser, by its frictional engagement, will hold the strip tightly around the article until the knife 17 engages it against the shearing edge 59. The cooperation between the knife and shearing edge severs the strip and simultaneously with the cutting of the strip, or even before complete severance, the heater element 18 engages the overlapped ends of the label wrapped around the article to hold it in position while the thermoplastic adhesive is rendered tacky so that the label may be affixed to the article.

When the feed chute shown in Fig. 8 is used, the presser foot 30 forces the strip against floor 49 and at the same time causes it to move with respect to this stationary floor. It is obvious that some frictional resistance to movement is thus encountered. In tensioning the label around the article its frictional resistance to movement may, with certain types of labels, become too great. In order to avoid this possibility, the modified construction shown in Fig. 16 has been provided, from which construction, the element causing this frictional resistance has been eliminated. As shown in Fig. 16 the label is positively engaged between the plate 83 and presser foot 30, and thus the friction between the moving label and a stationary means such as the floor 49 is precluded because the plate 83 moves with the feed lever 26. Upon the return or rearward movement of lever 26, the strip will be positively withdrawn or retracted until the proper tension is drawn and then the strip will slide between the plate 83 and presser foot 30, so that the proper tension is continued until the overlapped ends are engaged by the heater or holding means, and the strip is severed. It will be noted that a better control or adjustment of the tension to be placed on the strip may be accomplished with this modified construction.

The operation of the severing means is dependent somewhat upon the tension of the strip produced by the retraction of presser 30, and the knife may be spaced more or less from the shearing edge 59 depending upon the amount of tension produced in the strip. If the strip has been drawn quite taut, the knife may be spaced somewhat from the edge 59, and yet a good cutting action will result. To aid in cutting the taut strip, the knife may be provided with a saw tooth cutting edge as shown in Fig. 11 wherein the teeth 90 have sharpened points 91 that start the severance upon mere engagement with the strip. If the strip were drawn taut enough, it is conceivable that shearing edge 59 would not be called into play but as the tension is relaxed, to insure a clean cut, the shearing edge is provided to cooperate with the knife.

Because the tension aids in the cutting of the strip, the knife may be spaced slightly away from the shearing edge, as suggested above. This factor is of importance in the construction of the machine in that the tolerance permitted in the fit between the knife and shearing edge makes it possible to assemble these parts more easily.

With either of the strip feed devices shown in Figs. 2, 10 or 16, upon the rearward movement of lever 26 and after the label has been properly tensioned around the article, the presser foot 30 may rotate. The spring 41 engages the rear of the presser foot in such a manner that the presser foot may turn on axle 38 as the lever 26 is driven rearwardly, but will prevent rotation of the presser foot as the lever 26 is driven forwardly. This construction not only minimizes wear on the label strip, but also protects the surface of the presser foot in preventing it from becoming clogged with dust or particles adhering to the surface of the strip which might otherwise be rubbed into the surface of the presser as it slides over the strip on the rearward stroke.

The stand for the machine including the removable pans 85 is particularly useful for the purpose herein shown, and unbanded articles may be stored in one of the pans so that they may be easily picked up by the operator for insertion into the looped end of the strip to have the band tensioned around the article. As soon as the band has been applied to the article, the article may be withdrawn from the machine on the opposite side of the curling means, to be deposited in the other pan. Thus it is seen that the articles may be conveniently handled and disposed of. The articles may be fed from either side of the curling means as is readily apparent.

As soon as the banding operation has been completed the article may be withdrawn from the curling means 55, whereupon the foot may be released from the treadle and, because it is counterweighted, it will feed the strip into the curling means so that the machine will be set up ready for the banding of the next article. As long as the article being removed does not engage the periphery 56 of the curling means the incoming strip will be fed into proper position for application. However, if the article being withdrawn should accidentally engage the incoming label to force it out of the curling means the label may be easily rethreaded by merely retracting the strip into the guide by stepping on the treadle. The label being free to return will be withdrawn entirely into the guide chute 32 to the position it occupied before the feed stroke was started so that during the next cycle, if it is not interfered with, the strip may be formed into a proper loop.

While the above is a description of the preferred construction of this invention, many changes of form may occur to those skilled in the art. Such changes are contemplated to be within the scope of the invention as defined in the following claims.

We claim:

1. A machine for banding an article with a label, having means to deliver a strip of labels including means for pulling the label strip to tension the end label of the strip around the article with the ends of the label overlapped, means to time said means to deliver such that the strip is fed forwardly as the banded article is being withdrawn from the machine, and means operative after said label has been tensioned around the article to sever the end label from the strip and affix it to the article by joining the overlapped ends.

2. A machine for banding an article with a label having means to deliver a strip of labels including means to form the end label of the strip around the article with the ends of the label overlapped, means to time said means to deliver such that the strip is fed forwardly as the banded article is being withdrawn from the machine, means operative after said label has been tensioned around the article to sever said end label from the strip, and means cooperating with said severing means and engaging said severed label at the point of overlap only to affix the severed label to the article.

3. A machine for banding an article with a label having means to feed a strip of labels including means for pulling the label strip to tension the end label of the strip around the article with the ends of the label overlapped, means to time said means to deliver such that the strip is fed forwardly as the banded article is being withdrawn from the machine, means operative after said label has been tensioned around the article to sever the end label from the strip having a knife blade adapted to be rapidly driven against the tensioned strip to cut it, and means to affix the severed label to the article by joining the overlapped ends.

4. A machine for banding an article with a label having means to deliver a strip of labels including a guide chute for the strip, means to time said means to deliver such that the strip is fed forwardly in the guide chute as the banded article is being withdrawn from the machine, a resilient presser foot engaging the strip for feeding and retracting the strip through the chute to tension the end label of the strip around the article with the ends of the label overlapped, and means to sever the end label from the strip and affix it to the article by joining the overlapped ends.

5. A machine for banding an article with a label having means to deliver a strip of labels including a guide chute for the strip, said chute having a slot formed therein, a rigid surface and a cooperating resilient presser foot oscillating in the slot and engaging the strip for feeding and retracting the strip through the chute to tension the end label of the strip around the article with the ends of the label overlapped, and means to sever the end label from the strip and affix it to the article by joining the overlapped ends.

6. A machine for banding an article with a label having means to deliver a strip of labels including means for tensioning the end label of the strip around the article with the ends of the label overlapped, means to sever the end label from the strip and affix it to the article by joining the overlapped ends, and a manual rocker drive for all of said means, said drive being normally urged to rock in one direction to feed the strip, and said rocker being actuated in the opposite direction to cause the label to be affixed to the article.

7. A machine for banding an article with a label having means to deliver a strip of labels including means to tension the end label of the strip around the article with the ends of the label overlapped, a guide means for directing movement of the strip, means to sever the end label from the strip, said severing means being driven to cross the path of movement of the strip to effect its severance, a single drive means for actuating the delivering and severing means, a lost motion connection between said delivering and severing means to permit the severing means to cut said strip while it is stationary, and means to affix the severed label to the article.

8. A labeling machine having means for feeding and retracting a continuous strip of labels from which a single label is to be separated for application to an article, a guide chute for said strip, said feeding means including a presser foot for frictionally engaging the strip and mounted to have a tighter engagement if a resistance to movement of the strip is encountered, a curling means for receiving the label to be separated from said strip of labels for forming it into a loop, said means for feeding being actuated to drive said strip of labels into the curling means, the means for feeding being controlled to drive said strip of labels into the curling means until the extreme end of said strip is turned into overlapping relation with the strip, said means for retracting the strip of labels being actuated to tension the looped label around an article inserted in the loop with the article engaging the end of the strip adjacent said overlapped end to fixedly hold said end of the label, separating means operable after the retracting means has been actuated to separate the label tensioned around the article from the strip, and affixing means to cause the tensioned label to be permanently affixed to the article.

9. A machine for banding an article with a label having a driven means including a lever to effect the feeding of a strip of labels when moving in one direction and when moving in the opposite direction to effect the tensioning of the end label of the strip around the article with the ends overlapped, a guide means for directing movement of the strip, a driven lever carrying a knife to sever the end label from the strip, said knife being driven to cross the path of movement of the strip to effect its severance, said feed lever being driven from said knife carrying lever through a link pivotally connected between the two levers, a lost motion connection between one of said levers and said link to permit the knife to be retracted from the path of the strip before the strip is fed forwardly, and means to affix the severed label to the article.

10. A machine for banding an article with a label having a driven means including a lever to effect the feeding of a strip of labels when moving in one direction and when moving in the opposite direction to effect the tensioning of the end label of the strip around the article with the ends overlapped, a guide means for directing movement of the strip, a driven lever carrying a knife to sever the end label from the strip, said knife being driven to cross the path of movement of the strip to effect its severance, said feed lever being driven from said knife carrying lever through a link pivotally connected between the two levers, a lost motion connection between one of said levers and said link to permit the knife to be retracted from the path of the strip before the strip is fed forwardly, said lost motion connection comprising a pin affixed to one of said elements and a slot in the other of said elements, a spring engaging the pin to urge it in one direction in said slot, and means to affix the severed label to the article.

11. A manually controlled machine for applying a band to an article, said machine having a working station into which articles may be inserted at one side and withdrawn on the other side, comprising a standard upon which the banding mechanism is mounted, said standard also having pans removably mounted therein on opposite sides of the working station of said mechanism, one of said pans being provided for unbanded articles and the other for banded articles, said arrangement being provided so that a supply of articles to be banded may be placed in one of said pans within convenient reach of the operator and a receiving pan provided on the other side, whereby articles to be banded may be rapidly fed through the working station of the machine by the operator and the banded articles collected separately with a minimum of confusion.

12. A method of banding an article with a label from a strip of labels comprising forming a loop in the strip at a loop forming station with the end of said strip in overlapping relation to the rest of the strip, inserting the article into the loop, holding the end of said strip against the article adjacent the overlapped end, drawing the loop tight around the article, then severing the end label from the strip and binding the overlapped ends together, removing the article from the loop forming station, and feeding the strip forwardly to form a loop for the next article to be banded, said feeding being accomplished substantially simultaneously with said withdrawal.

13. A method of banding an article with a label from a strip of labels comprising forming a loop in the strip at a loop forming station with the end of said strip in overlapping relation to the rest of the strip, inserting the article into the loop, then tensioning the end label of the strip around the article, thereafter affixing the end label to the article and severing it from the strip, then removing the article from the loop forming station, and feeding the strip forwardly to form a loop for the next article to be banded, said feeding being accomplished simultaneously with said withdrawal.

14. A method of banding an article with a label from a strip of labels comprising forming a loop in the strip at a loop forming station, inserting the article into the loop, then tensioning the end label of the strip around the article, thereafter affixing the end label to the article and severing it from the strip, then removing the article from the loop forming station, and feeding the strip forwardly to form a loop for the next article to be banded, said feeding being accomplished simultaneously with said withdrawal.

CHARLES T. WALTER.
LOWELL R. NEWTON.